(12) United States Patent
Lin

(10) Patent No.: US 6,213,647 B1
(45) Date of Patent: Apr. 10, 2001

(54) DAMPING THRUST BEARING FOR VEHICLE STEERING KNUCKLE

(76) Inventor: Zhichan Lin, No. 442-2, Zhongnanlu, zhongshanqu, Dalianshi, Lianing Province (CN)

( * ) Notice: Subject to any disclaimer, the term of this patent is extended or adjusted under 35 U.S.C. 154(b) by 0 days.

(21) Appl. No.: 09/310,941

(22) Filed: May 13, 1999

(30) Foreign Application Priority Data

May 15, 1998 (CN) ................................................ 98214101

(51) Int. Cl.$^7$ ...................................................... F16C 17/06
(52) U.S. Cl. ............................................ 384/420; 384/909
(58) Field of Search ................................... 384/420, 421, 384/99, 909, 422

(56) References Cited

U.S. PATENT DOCUMENTS 5,277,500 * 1/1994 Keck ..................................... 384/204
5,664,890 * 9/1997 Nowak et al. ........................ 384/282

\* cited by examiner

*Primary Examiner*—Lenard A. Footland
(74) *Attorney, Agent, or Firm*—Lowe Hauptman Gilman & Berner, LLP

(57) ABSTRACT

A damping thrust bearing for vehicle steering knuckles, comprising a damping ring made of materials of low friction factor and strong impact-resistance and a ring-thrust ring. The lateral ring-form surface of said damping ring (6) has a sliding connection with the lateral ring-form surface of said thrust ring (7), so as to form a friction pair with sliding working surface (8). A shell (5), installed outside the friction pair formed by said damping ring (6) and said thrust ring (7), making the bearing an integral bearing.

1 Claim, 2 Drawing Sheets

DAMPING THRUST BEARING FOR VEHICLE STEERING KNUCKLE

FIELD OF INVENTION

The present invention relates to a bearing used in vehicle steering device, and more particularly relates to a damping thrust bearing for steering knuckle.

BACKGROUND OF THE INVENTION

In prior art steering device for vehicle and wheel engineering machine, in order to make the vehicle and the engineering machines to steer or revolve flexibly and smoothly within the scope of load, ball bearings or roller bearings are often used as the steering knuckle or steering revolving shaft. The rigidity of prior art bearings is very high, consequently, the bearing performances for absorbing impact energy, resisting erosion and lubricating effect are poor. Since the steering knuckles always run in a cantilever status, the force exerting on thrust bearing focuses on the side near the tire, consequently the ferrule on the same side and a few rolling bodies bear most load, and lead to partial plastic distortion and form concave holes. In addition, thrust bearings always bear strong impact, while excessive impact may distort the contact point between ferrule and rolling body partially and form concave holes. During most driving time, a vehicle does not turn round, when the thrust bearing is static, some concave holes (i.e. vibration traces) may form at the contact points due to the vibration around. These concave holes are produced by the recurrent minute sliding distortion and abrasion at the place of high contact stress between rolling bodies and rolling contact surface. Besides, water and moisture permeates the thrust bearings, which will produce rusts and pocks on the surface of the ferrule and sliding bodies, and make the sliding path in wave form. When steering tires roll on the ground, these partial concave holes and abrasions make them sway violently in the axis direction and have sliding friction with the ground. Then the tires stand great force and may change their direction. The fierce resonance produced by the steering system prevents the vehicle from normal running, causes quick abrasion of tires, and even engenders traffic accidents. Meanwhile, it will aggravate the grinding of the ground and shorten the ground life. In order to solve the problems, the following measures are employed on the vehicles: using tires with shorter diameter or wider tire, increasing the rigidity of front bridge, practicing independent suspension, using damping stabilizer, etc, but the effect has been proved very little.

SUMMARY OF THE INVENTION

One of the objectives of the present invention is to provide a damping thrust bearing for vehicle steering knuckle, which is abrasion and erosion resistant, absorbs impact energy and has high damping effect against vibration.

Another objective of the present invention is to provide a damping thrust bearing for vehicle steering knuckle, which is impact-erosion resistance and dust-water proof.

Further objective of the present invention is to provide a damping thrust bearing for vehicle steering knuckle, the bearing is self-lubricated and absorbs impact energy.

A damping thrust bearing for vehicle steering knuckles of this invention comprises two ring-form objects with the same inner hole diameter and outer diameter, a ring-form object is a damping ring, made of materials of low friction factor and strong impact-resistance;

a ring-form object is a thrust ring;

the lateral ring-form surface of said damping ling has a sliding connection with the lateral ring-form surface of said thrust ring, so as to form a friction pair with sliding working surfaces;

a shell, installed outside the friction pair formed by said damping ring and said thrust ring, making the thrust bearing an integral thrust bearing.

Further objectives and advantages of this invention will appear from the following description and the accompanying drawings.

PREFERRED EMBODIMENTS OF THE INVENTION

Figure 1:
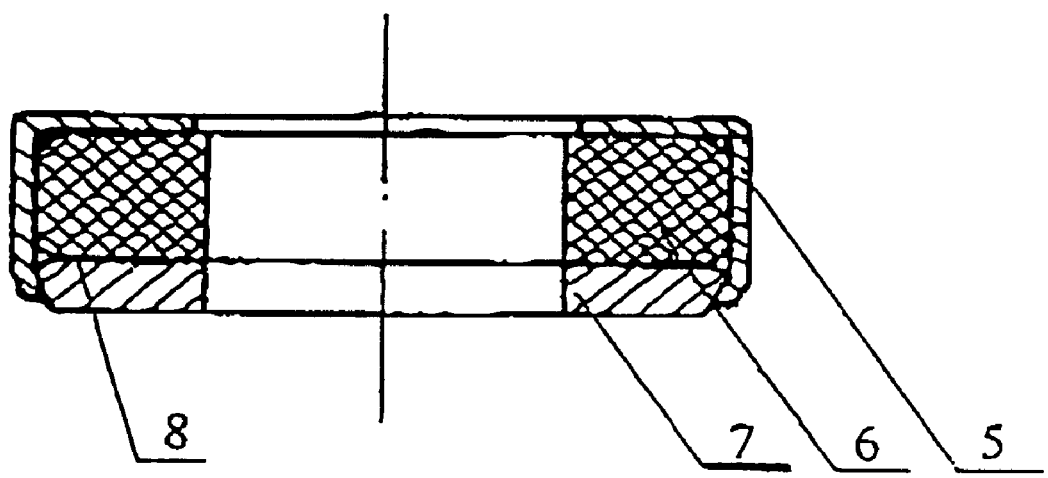
FIG. 1 is sketch showing structure of the damping thrust bearing for vehicle steering knuckles according to the present invention.

As shown in FIG. 1, the damping thrust bearing for vehicle steering knuckles is a friction pair formed by the sliding connection of damping ring 6 and thrust ring 7. Shell 5 is installed outside said friction pair, which makes the thrust bearing an integral sliding bearing. There are spaces between damping ring 6 and thrust ring 7, and friction pair and shell 5. Shell 5 may be installed at the outer edges of the friction pair, in this case, there are concave gutters on both sides of the outer edges of the friction pair formed by damping ring 6 and thrust ring 7, facilitating the package of shell 5. Shell 5 is used for preventing dust or water from entering the space between the working contact surfaces 8 of ring 6 and ring 7. Meanwhile, during the transportation of bearing products, shell 5 can keep the contact of ring 6 and ring 7 of the bearing. Shell 5 can also be put on outer surface of the friction pair formed by damping ring 6 and thrust ring 7 and on the surface of the damping ring 6 so as to prevent dust and water from entering the working surface of the bearing.

The working contact surfaces 8 of damping ring 6 and thrust ring 7 may be planes. The working contact surface 8 between damping ring 6 and thrust ring 7 may be processed into a round sphere with a certain curvature, so that with any working load, the bearing can maintain a fairly large working contact surface 8 between ring 6 and ring 7 of friction pair. Said two rings are matched by a pair of concavo-convex spheres and the center of the spheres can be changed during working. It is also allowable to keep a deviating angle of 30° between load working line of bearing and axes of bearing.

In this embodiment, the damping ring 6 of bearing is made of polyethylene (UHMW-PE) of ultra-high molecular weight. The damping ring 6 made of such material exhibits many superior performances, such as good self-lubrication, low friction factor, strong impact resistance and impact energy absorption, etc. At working time, the lubricating oil may be inserted into the working contact surface 8 between damping ring 6 and thrust ring 7.

Figure 2:
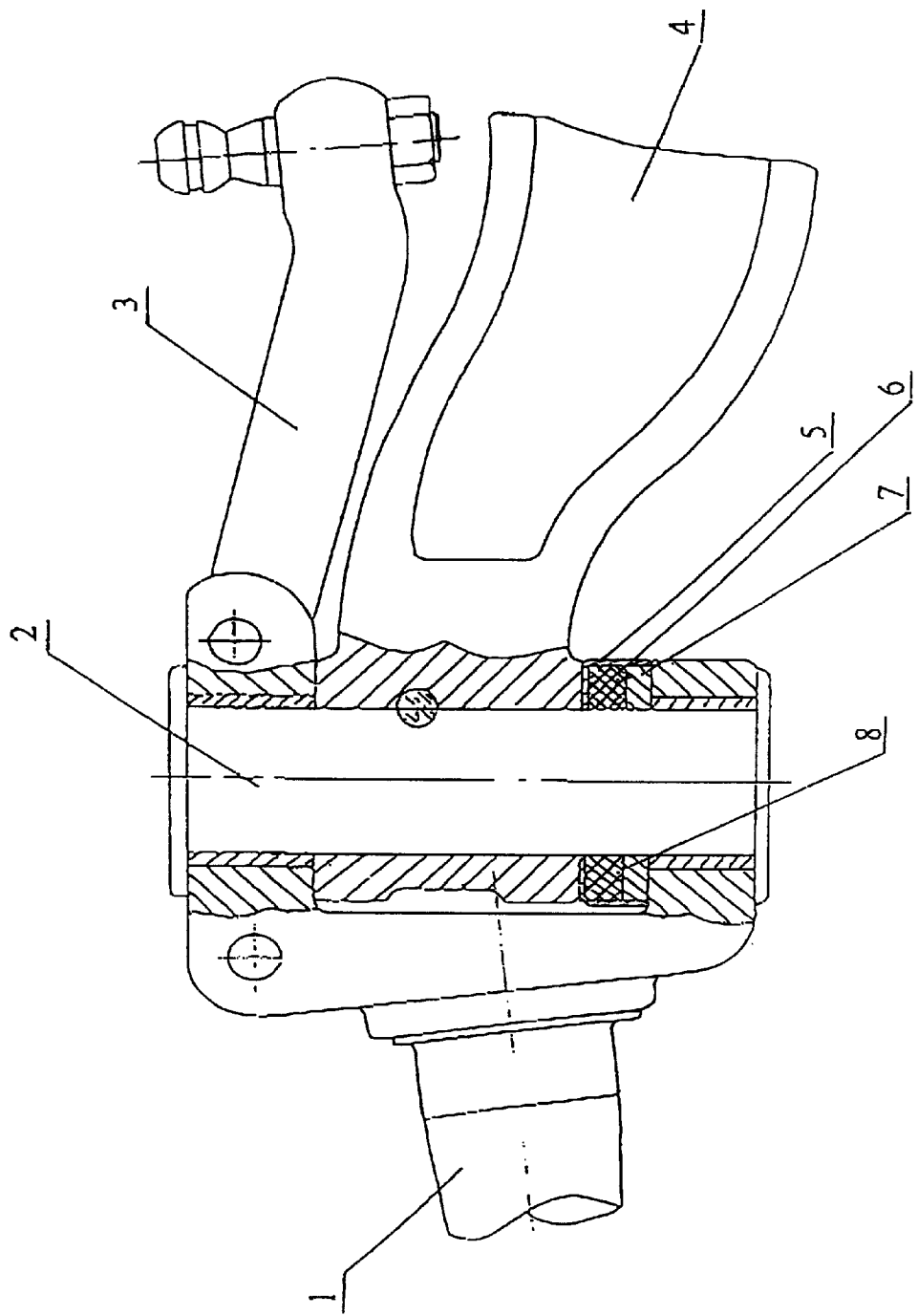
FIG. 2 is a sketch showing the installation and use of the damping thrust bearing for vehicle steering knuckles according to the present invention.

FIG. 2 shows the working theorem of the present invention installed on the vehicle steering device. The vehicle steering knuckle arm 3 is integrated with steering knuckle 1, and both of them and the front girder 4 of the vehicle are installed on the steering knuckle pivot bolt 2. The damping thrust bearing for vehicle steering knuckles is installed between the front girder 4 on the pivot bolt and the steering knuckle 1. When working with load, the front girder 4 burdens the weight of the load. The steering knuckle 1 burdening the transferred weight may revolve around the pivot bolt 2, which relies on the relative sliding between damping ring 6 and thrust ring 7 of said damping thrust bearing.

INDUSTRIAL APPLICATION

The merits of the present invention lie in: when working in the sliding status, this damping thrust bearing for vehicle steering knuckles completely overcomes the drawbacks of rolling thrust bearing. Said bearing has the performances of abrasion resistance, impact resistance and chemical erosion resistance, self-lubrication, impact energy absorption and agile steering. This bear greatly increases the stability of running vehicles, makes the steering tires run in the pure rolling condition.

What is claimed is:

1. A damping thrust bearing for vehicle steering knuckles, comprising two rings-formed objects with the same inner hole diameter and outer diameter, wherein one of said ring-form objects is a damping ring (6);

the other said ring-form object is a thrust ring (7);

wherein a lateral ring-form surface of said damping ring (6) has a sliding connection with a lateral ring-form surface of said thrust ring (7), so as to form a friction pair with sliding working surfaces (8); and a shell (5), installed outside the friction pair formed by said damping ring (6) and said thrust ring (7), making the bearing an integral bearing.

* * * * *